(12) United States Patent
Barth et al.

(10) Patent No.: US 7,450,781 B2
(45) Date of Patent: Nov. 11, 2008

(54) METHOD OF ENLARGING THE IMAGE FIELD OF A FOCAL PLANE ARRAY CAMERA

(75) Inventors: Jochen Barth, Oberschleißheim (DE); Michael Assel, Kissing (DE)

(73) Assignee: LFK-Lenkflugkörpersysteme GmbH, Unterschleißheim (DE)

( * ) Notice: Subject to any disclaimer, the term of this patent is extended or adjusted under 35 U.S.C. 154(b) by 1100 days.

(21) Appl. No.: 10/736,834

(22) Filed: Dec. 17, 2003

(65) Prior Publication Data

US 2004/0141660 A1 Jul. 22, 2004

(30) Foreign Application Priority Data

Dec. 18, 2002 (DE) ................ 102 59 667

(51) Int. Cl.
*G06K 9/36* (2006.01)
*G06K 9/32* (2006.01)

(52) U.S. Cl. ............... 382/284; 382/287; 382/289; 382/294

(58) Field of Classification Search ........ 382/284, 382/287, 289, 294
See application file for complete search history.

(56) References Cited

U.S. PATENT DOCUMENTS

| | | | | |
|---|---|---|---|---|
| 1,647,631 | A * | 11/1927 | Ives ............................ 348/202 |
| 2,975,668 | A * | 3/1961 | Eckel .......................... 359/211 |
| 3,378,687 | A * | 4/1968 | Schepler ................... 250/203.4 |
| 4,355,904 | A * | 10/1982 | Balasubramanian ........ 356/608 |
| 4,414,684 | A * | 11/1983 | Blonder ...................... 382/127 |
| 4,648,712 | A * | 3/1987 | Brenholdt ..................... 356/73 |
| 4,675,532 | A * | 6/1987 | Carson ........................ 348/294 |
| 4,717,823 | A * | 1/1988 | Steimel et al. .............. 250/236 |
| 5,389,791 | A | 2/1995 | Passmore |
| 5,449,898 | A | 9/1995 | Dosmann |
| 5,528,290 | A * | 6/1996 | Saund ....................... 348/218.1 |
| 5,581,637 | A * | 12/1996 | Cass et al. ................... 382/284 |
| 5,907,353 | A | 5/1999 | Okauchi |
| 5,964,432 | A * | 10/1999 | Obkircher .................. 244/3.16 |
| 6,005,682 | A | 12/1999 | Wu et al. |
| 6,639,625 | B1 * | 10/2003 | Ishida et al. ............. 348/218.1 |

(Continued)

FOREIGN PATENT DOCUMENTS

DE 19525153 1/1996

(Continued)

OTHER PUBLICATIONS

Lloyd, *Thermal Imaging System*, Plenum Press, NY, pp. 316-319 (1975).

(Continued)

*Primary Examiner*—Matthew C Bella
*Assistant Examiner*—Anthony Mackowey
(74) *Attorney, Agent, or Firm*—Greenblum & Bernstein, P.L.C.

(57) ABSTRACT

A method of enlarging an image field of a camera by combining partial images. This method includes continuously rotating at least two refractive prisms such that an optical axis of the at least two prisms scans in a cycloidal pattern. Furthermore the method includes capturing and combining a plurality of partial images. Finally, the cycloidal pattern is formed as an astroid pattern with a plurality of vertexes. The partial images are generated at the time of the reversal movement during the scanning in the astroid pattern, which limits unsharpness in the images kept to less than the size of a pixel.

10 Claims, 2 Drawing Sheets

U.S. PATENT DOCUMENTS

| | | | |
|---|---|---|---|
| 6,961,145 B2 * | 11/2005 | Smith | 358/1.2 |
| 7,016,551 B1 * | 3/2006 | Abe et al. | 382/284 |
| 7,272,253 B2 * | 9/2007 | Katsuta et al. | 382/141 |
| 2003/0142882 A1 * | 7/2003 | Beged-Dov et al. | 382/284 |

FOREIGN PATENT DOCUMENTS

| | | |
|---|---|---|
| EP | 0748108 | 12/1996 |
| JP | 64-38717 | 2/1989 |
| JP | 4-352124 | 12/1992 |

OTHER PUBLICATIONS

G.F. Marshall, "Risley Prism Scan Patterns", Proceedings of the SPIE, vol. 3787, Jul. 21, 1999, pp. 74-86.

P.A. Picot et al., An In-line Optical Image Translator with Applications in X-ray Videography, Medical Physics, vol. 17, No. 6, Nov. 1, 1990, pp. 983-988.

* cited by examiner

METHOD OF ENLARGING THE IMAGE FIELD OF A FOCAL PLANE ARRAY CAMERA

CROSS-REFERENCE TO RELATED APPLICATIONS

The present application claims priority under 35 U.S.C. § 119 of German Patent Application No. 102 59 667.0, filed on Dec. 18, 2002, the disclosure of which is expressly incorporated by reference herein in its entirety.

BACKGROUND OF THE INVENTION

1. Field of the Invention

This invention relates to a method of enlarging an image field of a camera, such as a focal plane array camera. The image field, which consists of N pixels, is produced by combining scanned partial images which each consist of n pixels. The invention also relates to apparatuses for carrying out the method.

2. Discussion of Background Information

In order to record a large image field at high resolution using a camera, such as a focal plane array camera, it is necessary to use a detector, with a correspondingly large number of elements (pixels). This results in high costs, particularly with use of an IR detector. Alternatively, the large image field can be assembled from a plurality of smaller images which are displaced in relation to each other. This necessitates a "step-scan" mechanism, by which the optical axis is displaced from individual image to individual image but remains fixed during the recording time. This can be problematic, particularly with cameras which are mounted on a moveable platform for alignment. The step-by-step movement produces unwanted torque effects which can have an unfavorable effect on the alignment. Moreover, the step-by-step movement is associated with increased energy consumption.

A scanning principle has been employed in, for example, J. M. Lloyd, Thermal Imaging Systems, 1975, Plenum Press, N.Y. by using two rotating, refractive prisms. By suitably selecting the angle of deflection and the velocities of rotation, different scanning patterns can be created, which include, amongst others, an astroid pattern proposed according to the present invention. In the past, similar scanning patterns (cycloids) were employed for recording a 2-dimensional image field by an individual detector or a detector array.

SUMMARY OF THE INVENTION

In contrast, what is proposed according to the present invention is that an image which is already two-dimensional is used instead of an individual detector point or a detector array line, and that a reversal of movement at the vertexes of the astroid is used in order to keep the blurriness or unsharpness due to the scanning process below the size of a pixel during a recording time of an individual image.

The present invention provides a method which produces a "step scan" by scanning elements which are moved continuously.

The implementation of the step-scan method with the aid of continuously rotating prisms according to the invention simplifies the electronic triggering of the scanner or camera, reduces energy consumption, reduces the heat dissipated during scanner operation, and prevents the occurrence of periodic, unwanted torque effects. These advantages are particularly important for the use in vehicles, such as for example the scanner in homing heads comprising swivel-and-tilt platforms used in missiles.

One aspect of the present invention is a method of enlarging the image field of a focal plane array camera, wherein the image field, which consists of N pixels, is produced by combining scanned partial images which each consist of n pixels. The method is characterized in that a cycloidal scan pattern, which is in the form of an astroid, is formed with the aid of at least two continuously rotating refractive prisms. The number of vertexes of the astroid outline, which correspond to the points of reversal of the scanning movement, corresponds to the number of partial images. The reversal of movement at the vertexes of the astroid outline is used in order to keep the unsharpness, due to the scanning process, below the size of a pixel during the recording time of an individual image.

One aspect of the present invention is directed to a method of enlarging an image field of a camera by combining partial images. This includes continuously rotating at least two refractive prisms to form a cycloidal scan pattern. The cycloidal scan pattern having points of reversal of scan movement that corresponds to a number of vertexes of the cycloidal scan pattern and to a number of partial images. Furthermore, in the method, the cycloidal pattern is a astroid pattern with a plurality of vertexes and the camera is a focal plane array camera. Additionally, the image field comprises N pixels and the partial images comprise n pixels and such that the partial images overlap to form a combined image. The reversal of movement at the vertexes of the astroid pattern reduces unsharpness to less than a size of a pixel during a recording time of an individual image. Furthermore, the point of reversal occurs substantially in a midpoint of the recording time of the individual images. The method also includes producing four partial images using the astroid pattern and combining the four partial images. The combined partial images overlap. The method further includes projecting at least one alignment mark in to a region of overlap of the individual images, measuring a shift between partial images by an image processor, and assembling the partial image based on the measured at least one alignment mark to form a combined image. With this method, either limiting the projection of the at least one alignment mark to a few scanning cycles, or making the projection of the at least one alignment mark is permanent is provided. Finally, the at least one alignment mark is projected into an edge region of the combined image.

Another aspect of the present invention relates to a method of enlarging the image field of a camera by combining images. This method includes continuously rotating at least two refractive prisms such that an optical axis of the at least two prisms scans in a cycloidal pattern, and, capturing a plurality of images. The cycloidal pattern is formed as an astroid pattern with a plurality of vertexes. Further in the method, a number of the vertexes of the astroid pattern corresponds to points of reversal of the optical axis scan movement and corresponds to a number of partial images that are combined. The method also sets forth that the reversal of movement at the vertexes of the astroid pattern reduces unsharpness to less than a size of a pixel during a recording time of an image. Additionally, the method includes setting a recording time of the partial images such that the points of reversal are substantially in a midpoint of the recording time. Finally, the method can include four partial images that are combined using the astroid pattern which has four vertexes.

Yet another aspect of the present invention relates to a apparatus having a first optical element that is configured to rotate about an axis and a second optical element that is configured to rotate about the axis. The apparatus further includes a camera that captures a plurality of images. Finally, the first optical element and the second optical element form an optical axis that follows a cycloidal pattern. In the apparatus the cycloidal pattern is in the form of an astroid pattern and the astroid pattern has a plurality of vertexes. The apparatus also has an image processor that determines the position of the projected alignment marks. Furthermore, the apparatus camera captures each of the plurality of partial images during a time that a center of the optical axis is at the vertex of the pattern.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
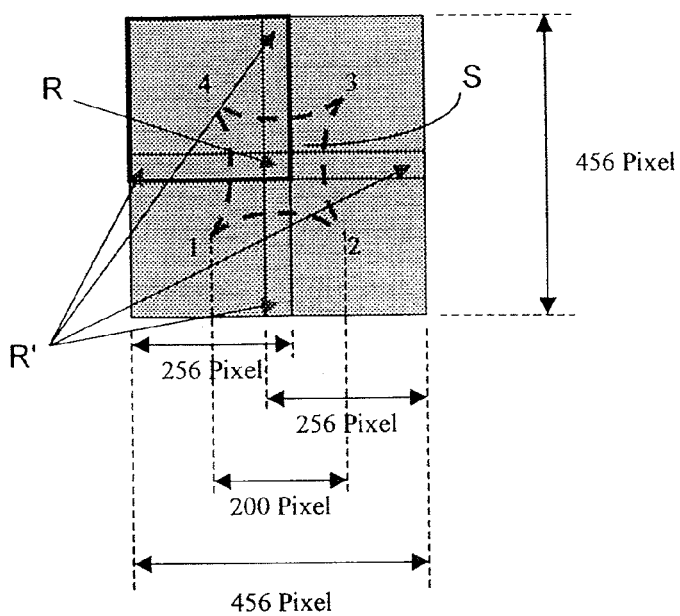
FIG. 1 is a schematic illustration of the assembly of the overall image from four individual partial images.

FIG. 1 is a schematic illustration of the assembly of the overall image, which comprises 456×456 pixels, for example, and which is formed by combining four individual images 1-4, each of which comprises 256×256 pixels. The distance between the image centers is 200 pixels. Thus, there is an area of overlap that is 56 pixels wide in each case. The four images are captured when an optical axis is positioned at or about the vertexes of an astroidal scanning movement S. The manner in which the movement S is produced is described below. Also shown in FIG. 1 are four positions R' that are alignment marks for aligning the images. These can be provided in the edge region of the areas of overlap of the individual images. In a central area of the overlap there is provided a temporary alignment mark R for adjusting the overall image. It should be understood that it would be within the spirit and scope of the present invention to use any number of pixels and with any amount of pixel overlap. Additionally, the combining of the partial images may be accomplished without the use of the alignment marks.

Figure 2:
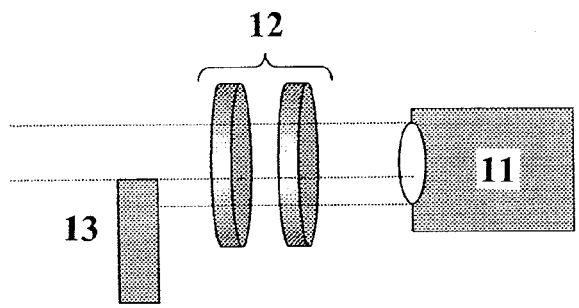
FIG. 2 is a schematic illustration of the construction of a camera arrangement which is employed for carrying out the method according to the invention.

FIG. 2 is a schematic illustration of the construction of a camera arrangement and associated structure which is employed for carrying out the method. The arrangement includes a camera 11, in front of which there are two optical deflection elements 12 for deflecting the optical axis and thus a viewing direction of the camera 11. The camera can include a charge coupled device (CCD) or a infrared (IR) detector, for example only. An apparatus 13 is employed for the projection of alignment marks. Furthermore, the apparatus can include an image processor, not shown, that can combine the images with the alignment marks. It should be understood that it would be within the spirit and scope of the present invention to use any number of deflection elements 12 in order to provide the desired scanning pattern.

Figure 3:
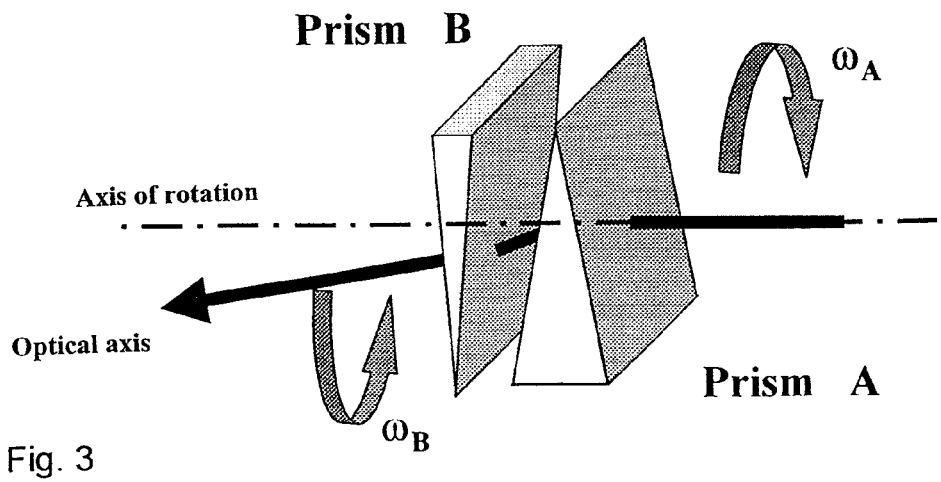
FIG. 3 shows the course of the rays in the two oppositely rotating prisms.

Next, FIG. 3 shows the course of the rays or optical axis that is created by the two optical deflection elements. The optical deflection elements can take the form of two prisms A and B. In the present method the two optical deflection elements are continuously rotated at angular velocities $\omega_A$ and $\omega_B$ about a common axis of rotation. The optical axis of the system is deflected corresponding to the position of rotation of the prisms.

Figure 4:
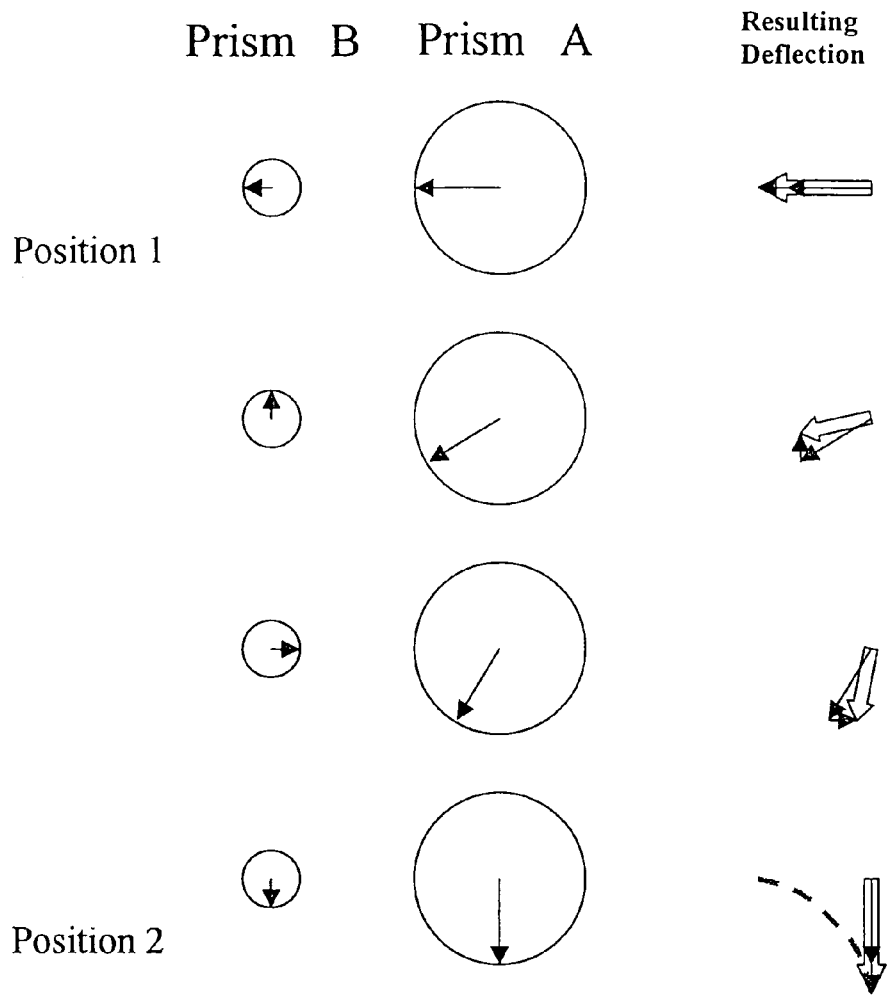
FIG. 4 is a schematic illustration of the production of the scanning pattern.

FIG. 4 shows the deflection of the viewing direction due to the cooperation of the two prisms during a quarter-cycle from scanning position 1 to scanning position 2 through the scanning movement S of the optical axis. The left column shows the radial position of the prism B, the center column shows the radial position of prism A, and the right column shows the resulting deflection of the optical axis through the vector summation of the optical deflection of prism A and the optical deflection prism B. The following relationships are applicable to the complete scanning pattern:

| Prism deflection angle: | $\alpha_A = 3 \cdot \alpha_B$ |
|---|---|
| Maximum total deflection angle: | $\alpha_{max} = 4 \cdot \alpha_B$ |
| Velocity of rotation: | $\omega_A = -1/3 \cdot \omega_B$ |

The deflection angle at prism B depends on the angle at which the optical axis meets the prism. This angle of impingement is very small so that the following derivations are a good approximation. More specifically, only the points of reversal of the scanning movement are important for the description of the method because they are points at which the images are captured.

Figure 5:
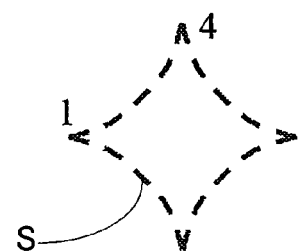
FIG. 5 shows the scanning pattern as at parametric representation.
Figure 5:
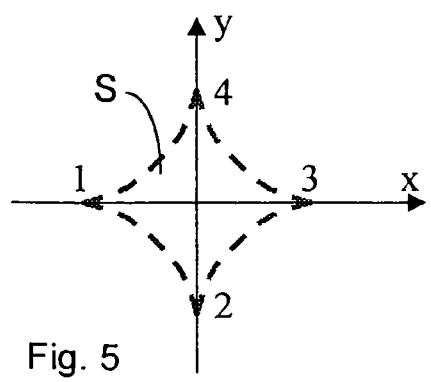

The parametric representation of the scanning pattern shown in FIG. 5 is described by:

$$x = 3\alpha \cdot \cos \omega t + \alpha \cdot \cos 3\omega t$$

$$y = 3\alpha \cdot \sin \omega t - \alpha \cdot \sin 3\omega t$$

where $\alpha$ is a scaling factor for the deflection angle.

Expansion into a series about $t_o = 0$ (corresponding to point "3") gives:

$$\begin{aligned} x &= 3\alpha \cdot (1 - 0.5\omega^2 t^2) + \alpha \cdot (1 - 4.5\omega^2 t^2) \\ &= 4\alpha - 6\alpha\omega^2 t^2 \\ y &= 3\alpha \cdot \omega t - 3\alpha \cdot \omega t + 0(\omega t)^3 \\ &= 0(\omega t)^3 \end{aligned}$$

For example, when the scanning speed approaches zero at $t_o=0$; for $|t_o|\ll 1$, the scanning speed on one axis increases with the square of t and on the other axis it increases with $t^3$. The same principle applies to each of the corner points or vertexes of the scanning pattern. It follows that for a scanning pattern which is rotated by 45° from the orientation shown in FIG. 5 to the orientation of FIG. 1, a rectangular overall image can be assembled from four rectangular individual images.

Figure 6:
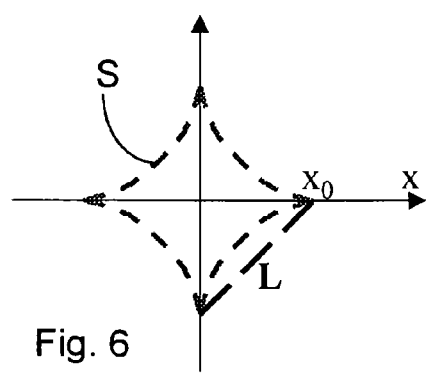
FIG. 6 is a representation for calculating the image blur.

As shown in FIG. 6, the image blur at $t_o=0$ can be approximately calculated with:

$$x=x_0-\delta x=4\alpha-6\alpha\omega^2\delta t^2$$

where $\delta x=6\alpha\omega^2\delta t^2$

Setting $x_0=4\alpha$ gives $$\delta x=(3/2)x_0\omega^2\delta t^2$$

Setting $L=\sqrt{2}x_0$; $\omega=2\pi/T_{per.}=\pi/(2\Delta t)$; and $\delta t=t_{int.}/2$ gives $$\delta x = 3\pi^2/(32\sqrt{2})\cdot(t_{int.}/\Delta t)^2\cdot L$$
$$= 0.65\cdot(t_{int.}/\Delta t)^2\cdot L$$

In the above equations:
- $\delta x$=magnitude of the image blur in the x direction
- $\delta t$=relevant period of time for image blur
- $L$=spatial mismatch between two images
- $T_{per}$=period of rotation for the astroid outline
- $\Delta t$=chronological interval between two successive partial images
- $t_{int}$=integration time for an image.

During the recording time, image blur occurs along the pixel diagonals so that the image blur remains within a pixel. The following ratio of recording time to scanning time ("scanning efficiency") results from the above formula:

$$\delta x=0.65\cdot(t_{int.}/\Delta t)^2\cdot L<\sqrt{2} \text{ (where L is in pixel edge length units)}$$

$$t_{int.}/\Delta t<\sqrt{(2/200)}=1:10$$

This results in a suitable solution for the process according to the invention. It should be further mentioned that, instead of the refractive prisms used in the example described, other suitable components can be used to deflect the optical axis, such as reflecting surfaces or active optical components, provided that the spectral region to be processed permits appropriate deflection. Moreover, more than two elements can optionally be used in order to produce the scanning movement. In addition, it is possible to make a fine adjustment of the optical axis by tilting the axes of rotation of the prisms.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. The instant abstract is neither intended to define the invention disclosed in this specification nor intended to limit the scope of the invention in any way.

What is claimed:

1. A method of enlarging an image field of a focal plane array camera, the image field consisting of N pixels, by combining scanned partial images, each partial image consisting of n pixels, said method comprising:
   forming an astroid-shaped cycloid scan pattern by means of at least two continuously rotating refractive prisms;
   said astroid-shaped cycloid scan pattern includes a number of vertexes corresponding to points of reversal of scan movement and corresponding to a number of partial images;
   respective ones of said partial images are generated during reversal of movement at said vertexes of said astroid-shaped scan pattern during said forming of said astroid-shaped cycloid scan pattern;
   each of said partial images is generated, during said reversal of movement at said vertexes of said astroid-shaped scan pattern, for a predeterminate recording time to limit unsharpness to less than a size of a pixel.

2. The method according to claim 1, wherein:
   each of the points of reversal occurs substantially in a midpoint of a recording time of the individual images.

3. The method according to claim 1, wherein:
   said astroid-shaped cycloid scan pattern is formed with four vertexes and the enlarged image field is formed by generating and combining four partial images.

4. The method according to claim 1, wherein:
   said astroid-shaped cycloid scan pattern is formed with four vertexes and the enlarged image field is formed by generating and combining four partial images, said combined four partial images having overlapping regions.

5. The method according to claim 4, further comprising:
   projecting at least one alignment mark into a region of overlap of individual ones of the partial images;
   measuring a shift between partial images by an image processor; and
   assembling the partial images based on the measured shift to form a combined image.

6. The method according to claim 5, wherein:
   said projecting of the at least one alignment mark is limited to a few scanning cycles.

7. The method according to claim 5, wherein:
   said projecting of the at least one alignment mark comprises permanently projecting the at least one alignment mark.

8. The method according to claim 5, wherein:
   said projecting of the at least one alignment mark comprises projecting the at least one alignment mark in one or more edge regions of overlap of the individual images.

9. The method according to claim 5, wherein:
   said projecting of the at least one alignment mark comprises projecting an alignment mark in a central area of overlap of the combined image.

10. The method according to claim 1, wherein:
    during said recording time, unsharpness occurs along pixel diagonals, thereby containing unsharpness to within a pixel.

* * * * *